United States Patent [19]

Aoki

[11] Patent Number: 4,931,884
[45] Date of Patent: Jun. 5, 1990

[54] SKEW COMPENSATION CIRCUIT EFFECTIVELY OPERATED DURING READOUT IN A REVERSE SENSE

[75] Inventor: Yoshitaka Aoki, Tokyo, Japan
[73] Assignee: NEC Corporation, Tokyo, Japan
[21] Appl. No.: 242,447
[22] Filed: Sep. 9, 1988
[30] Foreign Application Priority Data

Sep. 10, 1987 [JP] Japan .................................. 62-226976

[51] Int. Cl.⁵ ............................................ G11B 20/20
[52] U.S. Cl. ...................................................... 360/26
[58] Field of Search ...................................... 360/26, 51

[56] References Cited

U.S. PATENT DOCUMENTS 4,731,676  3/1988  Berlekamp ............................ 360/26
4,811,123  3/1989  Yoshinaka .............................. 360/26

*Primary Examiner*—Vincent P. Canney
*Attorney, Agent, or Firm*—Sughrue, Mion, Zinn, Macpeak & Seas

[57] ABSTRACT

In a skew compensation circuit for compensating for a skew among a plurality of readout signal sequences which are read out of a plurality of tracks of a magnetic tape driven in a normal sense and a reverse sense and each of which includes standard data parts and an additional data part partitioned by resynchronization codes, a data number of the additional data part is counted by each compensator unit at every track during readout in the reverse sense. The data numbers of the respective tracks are statistically processed by a resynchronization position detector to determine a position of an initial one of the resynchronization codes that appears in the reverse sense. Each compensator unit compensates for the skew during readout in the reverse sense with reference to the position determined by the resynchronization position detector.

3 Claims, 6 Drawing Sheets

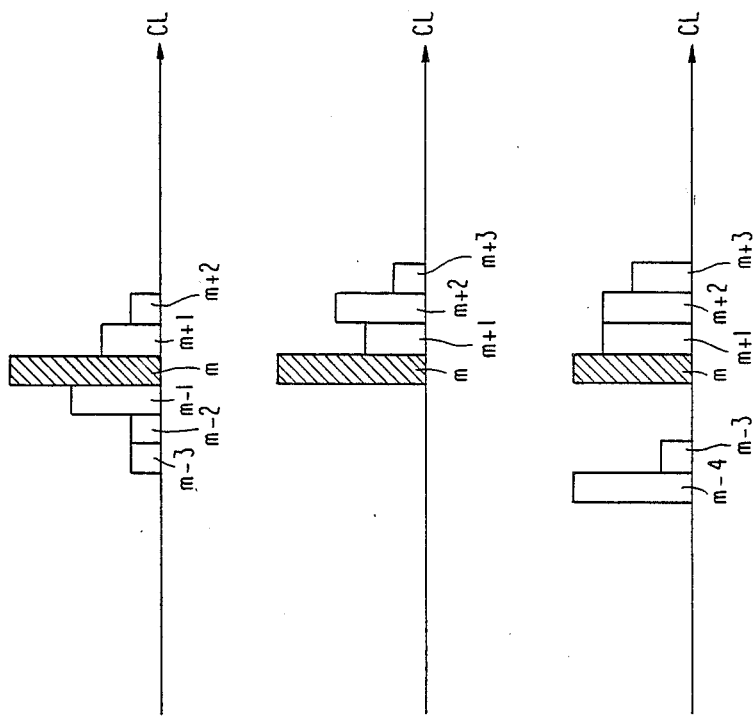

SKEW COMPENSATION CIRCUIT EFFECTIVELY OPERATED DURING READOUT IN A REVERSE SENSE

BACKGROUND OF THE INVENTION

This invention relates to a skew compensation circuit for use in a magnetic tape controller interposed between a utilization device, such as an electronic computer, and a magnetic tape having a plurality of tracks.

In general, such a magnetic tape is driven or rotated along a rotation direction not only in a normal sense but also in a reverse sense. In addition, a plurality of readout signal sequences are simultaneously read out of the respective tracks of the magnetic tape by the use of a single magnetic head. In this event, the readout signal sequences should be read out of the magnetic tape with phases of the respective readout signal sequences matched with one another. However, it is practically difficult to match the phase of the respective readout signal sequences with one another due to expansion or shrinkage of the magnetic tape. As a result, phase differences or skews objectionably take place among the readout signal sequences read out of the magnetic tape of the above-mentioned type. Under the circumstances, the magnetic tape is controlled by a magnetic tape controller which usually comprises a skew compensation circuit for compensating for the skews among the readout signal sequences read out of the respective tracks.

A wide variety of signal formats are used to record or memorize on the magnetic tape a plurality of data signal sequences which are read out as the readout signal sequences with the signal formats kept unchanged. In this connection, description will be made only about the signal formats of the data signal sequences memorized on the magnetic tape, although specific description will not be made hereinafter. At any rate, each of the signal formats is similar to one another in that start and end identification codes are located to indicate a start position of the data signal sequences and an end position thereof, respectively. In addition, a plurality of resynchronization codes are interspersed between the start and the end identification codes so as to ensure synchronization of the magnetic tape during rotation of the magnetic tape. The start and the end identification codes and the resynchronization code are recorded on each track and are to be simultaneously reproduced from the respective tracks unless any skews or phase differences take place among the readout signal sequences.

A plurality of standard or first data portions are placed in the normal sense between the start identification code and a leading one of the resynchronization codes and between two adjacent ones of the resynchronization codes while an additional or second data portion is placed between a trailing one of the resynchronization codes and the end identification code. Each of the standard data portions has a standard or first length for arranging a predetermined number of data units each of which may be composed of nine bits. The predetermined number may be, for example, 70. The additional data portion has an additional or second length which is not longer than the first length and which is not invariable.

Under the circumstances, a conventional skew compensation circuit is operable in response to the readout signal sequences to compensate for the skews by detecting the start identification code, the end identification code, and the resynchronization codes and to successively produce the data units which are derived from the respective tracks and which are subjected to skew compensation. According to the conventional skew compensation circuit, it is possible to correctly determine positions of the resynchronization codes of the respective tracks by monitoring the first length of each of the standard data portions insofar as the magnetic tape is rotated in the normal sense.

Herein, it is assumed that the magnetic tape is rotated in the reverse sense so that readout operation is successively carried out from the end identification code towards the start identification code. In this case, the trailing one of the resynchronization codes is at first read out of each of the tracks after readout of the end identification codes. Inasmuch as the additional length of the second data portion is variable and is therefore not known in the readout signal sequences while the magnetic tape is rotated in the reverse sense, each trailing resynchronization code may variably be read out of each track. This shows that the trailing resynchronization codes might be variably detected from the respective tracks at different time instants. As a result, positions of the trailing resynchronization codes might be incorrectly determined by the conventional skew compensation circuit.

SUMMARY OF THE INVENTION

It is an object of this invention to provide a skew compensation circuit which is capable of correctly determining positions of resynchronization codes during rotation of a magnetic tape in both a normal sense and a reverse sense.

It is another object of this invention to provide a skew compensation circuit of the type described, wherein trailing resynchronization codes can be correctly detected from the respective tracks during rotation of the magnetic tape in the reverse sense.

A skew compensation circuit to which this invention is applicable is operable in response to a plurality of readout signal sequences read out of a plurality of tracks of a magnetic tape, respectively, driven in a selected one of normal and reverse senses. Each of the readout signal sequences is composed of a start code, an end code, a plurality of resynchronization codes interspersed between the start and the end codes, a plurality of standard data parts between the start code and a leading one of the resynchronization codes and between the adjacent ones of the resynchronization codes, and an additional data part between a trailing one of the resynchronization codes and the end code. Each of the standard data parts has a standard length for arranging a preselected number of data signals while the additional data part has an additional length which is not longer than the standard length. The start, the end, and the resynchronization codes of the respective readout signal sequences are produced simultaneously with one another unless a skew is present among the tracks. According to this invention, the skew compensation circuit is for compensating for the skew among the tracks and comprises counting means individually supplied with the readout signal sequences read out of the magnetic tape driven in the selected one of the normal and the reverse senses for individually counting numbers of the data signals of the standard and the additional data parts in response to the start, the end, and the resynchronization codes derived from the respective tracks to produce data number signals representative of the numbers of the data signals arranged in the standard and the additional parts on the respective tracks and processing means coupled to the counting means for statistically processing the data number signals to detect the additional lengths of the additional data parts and to determine a position which the trailing one of the resynchronization codes has in each readout signal sequence read out while the magnetic tape is driven in the reverse sense.

BRIEF DESCRIPTION OF THE DRAWINGS

FIGS. 7(a), (b), and (c) show graphical representations of statistical operation of the resynchronization portion detector illustrated in FIG. 4.

DESCRIPTION OF THE PREFERRED EMBODIMENT

Figure 1:
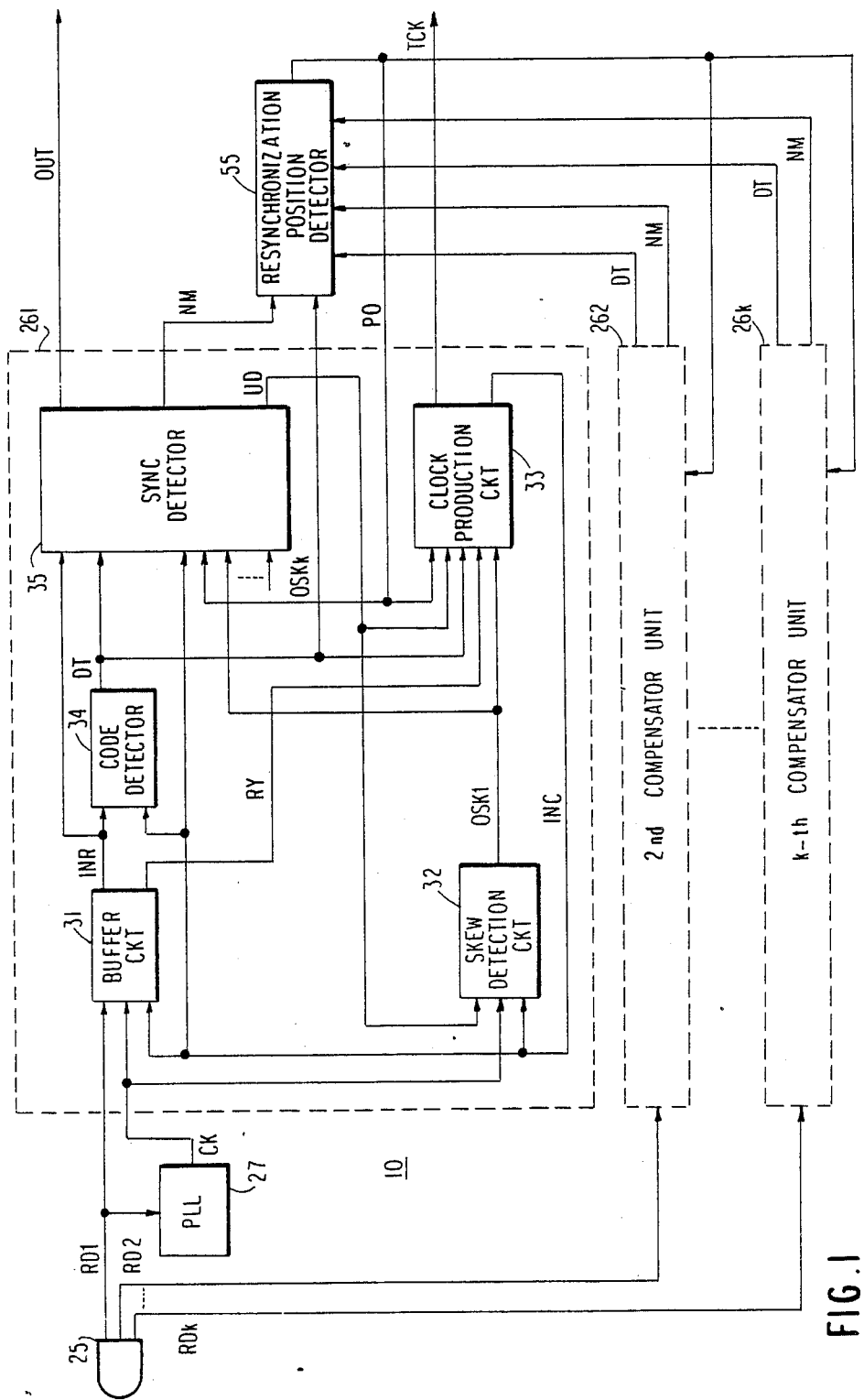
FIG. 1 shows a block diagram of a skew compensation circuit according to a preferred embodiment of this invention.
Figure 2:
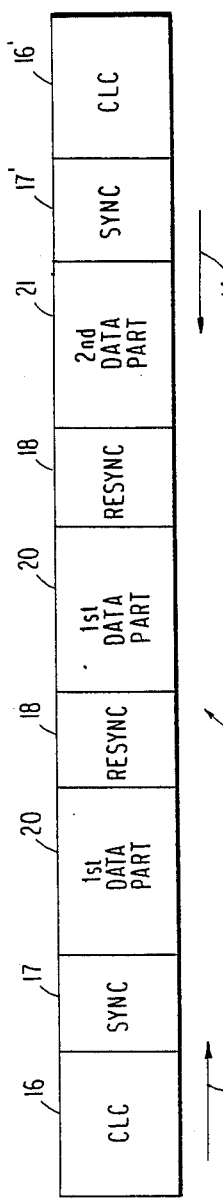
FIG. 2 shows a magnetic tape which is for use in combination with the skew compensation circuit illustrated in FIG. 1 and on which data signal sequences are recorded with a data format exemplified in FIG. 2.

Referring to FIGS. 1 and 2, a skew compensation circuit 10 according to a preferred embodiment of this invention is operable in cooperation with a magnetic tape 11 (FIG. 2) which is selectively rotatable or driven along a rotation direction in a normal sense depicted at an arrow 13 (FIG. 2) and in a reverse sense depicted at an arrow 14.

In FIG. 2, the illustrated magnetic tape 11 is divided into a first through k-th tracks along a direction transverse to the rotation direction, although not shown in FIG. 2, where k is a preselected number greater than unity. The preselected number may be equal to seven, nine, or the like. As shown in FIG. 2, a clock synchronization code (CLC) 16 and a start identification code (SYNC) 17 are placed along the normal sense 13 at a leading end of the data format of the magnetic tape 11. The clock synchronization code 16 serves to establish self-clocking operation while the start identification code 17 serves to indicate a beginning of each data signal sequence following the start identification code 17. In this connection, the start identification code 17 may be called a data synchronization code. Likewise, an additional data synchronization code (SYNC) 17' is placed along the normal sense at a trailing end of the magnetic tape 11 and is identical with the data synchronization code 17. The additional data synchronization code (SYNC) acts to specify an end of each data signal sequence and may therefore be called an end identification code. The end identification code is followed in the normal sense by an additional clock synchronization code (CLC) 16' which is identical with the clock synchronization code 16.

A plurality of resynchronization codes (RESYNC) 18 are interspersed between the data synchronization code 17 and the additional data synchronization code 17' to indicate positions of resynchronizing the data signal sequences of the respective tracks with one another.

Each of the clock synchronization code 16, the data synchronization code 17, the additional data synchronization code 17', the additional clock synchronization code 16', and the resynchronization codes 18 exhibits a bit pattern symmetrical with respect to a center bit of each code. This shows that each of the above-mentioned codes can be detected not only in the normal sense 13 but also in the reverse sense 14 during readout operation of the magnetic tape 11.

In FIG. 2, a plurality of standard or first data prts 20 are intermediate between the data synchronization code 17 and a leading one of the resynchronization codes 18 and between two adjacent ones of the resynchronization codes 18 while an additional or second data part 21 is intermediate between a trailing one of the resynchronization codes 18 and the additional data synchronization code 17'. Herein, it is to be noted that each of the standard data parts 20 is composed of a predetermined number of data units and therefore has a standard or first invariable length and that the additional data part 21 has an additional or second length which is variable and which is not longer than the first length.

As known in the art, the start and the end identification codes 17 and 17' and the resynchronization codes 18 have specific patterns which are different from one another and also from the clock synchronization codes 16 and 16' and the standard and the additional data parts 20 and 21. Thus, it is possible to distinguish the start and the end identification codes 17 and 17' and the resynchronization codes 21 from the other codes illustrated in FIG. 2.

Referring back to FIG. 1, the illustrated skew compensation circuit 10 is for use in combination with a reproducing head 25 which is magnetically coupled to the magnetic tape 11 (not shown in FIG. 1). First through k-th readout signal sequences RD1 to RDk are read out of the first through k-th tracks of the magnetic tape 11 to be individually sent to first through k-th compensator units depicted at 261 to 26k, respectively. The first through k-th readout signal sequences RD1 to RDk are delivered to phase locked loop (PLL) circuits one of which is depicted at 27 in FIG. 1 in connection with the first compensator unit 261. Each of the phase locked loop circuits 27 establishes clock synchronization to produce a sequence of clock pulses CK in response to the clock synchronization code (CLC) (FIG. 2) read out of each track. As a result, each readout signal sequence RD is supplied to each compensator unit 26 in synchronism with the clock pulse sequence CK extracted from the corresponding track. Inasmuch as the first through k-th compensator units 261 to 26k are operable in a similar manner, the following description will be restricted only to the first compensator unit 261.

In FIG. 1, the first compensator unit 261 comprises a buffer circuit 31 which is supplied with the first readout signal sequence RD1 in synchronism with the clock pulse sequence CK and which will be called a deskew buffer. The buffer circuit 31 may be of a first-in-first-out type. The clock pulse sequence CK is also supplied to a skew detection circuit 32 which is operable in a manner to be described later in detail.

The buffer circuit 31 produces a ready signal RY to specify that the buffer circuit 31 can carry out a readout operation, when the buffer circuit 31 is loaded with the first readout signal sequence RD1 synchronized with the clock pulse sequence. Supplied with the ready signal RY, a clock production circuit 33 delivers a sequence of internal clock pulses INC to the buffer circuit 31, the skew detection circuit 32, a code detector 34, and a synchronization detector 35. Responsive to the internal clock pulse sequences INC given as a readout clock sequence, the buffer circuit 31 successively produces the first readout signal sequence RD1 as a sequence of internal readout signals INR. The internal readout signal sequence INR is identical with the first readout signal sequence RD1 and is supplied to the code detector 34 on one hand and to a synchronization detector 35 on the other hand. In this connection, a plurality of data units are arranged in the standard and the additional data parts of the internal readout sequence INR.

The code detector 34 detects the start identification code (SYNC) 17, the resynchronization codes (RE-SYNC) 18, and the end identification code 17' from the internal readout signal sequence INR to supply the synchronization detector 35 with a detection signal DT representative of detection of the above-mentioned codes. The detection signal DT appears each time when each of the start identification code 17, the resynchronization codes 18, and the end identification code 17' is detected by the code detector 34. The detection signal DT lasts while each code is being detected by the code detector 34.

Herein, it may be recognized for the time being that the synchronization detector 35 produces an undetection signal UD representative of undetection of any detection signal DT when at least one of the first through k-th compensator units 261 to 26k is put into an overskew state, as will become clear as the description proceeds. At any rate, it may be understood that the undetection signal UD disappears when the detection signal DT is detected in the first compensator unit 261.

Supplied with the clock pulse sequence CK, the internal clock sequence INC, and the undetection signal UD, the skew detection circuit 32 detects the number of the internal readout signals IR read out of the buffer circuit 31. More specifically, the skew detection circuit 32 comprises a counter which is counted up by the clock pulse sequence CK and counted down by the internal clock sequence INC. Such count up and count down operation of the counter is carried out in the presence of the undetection signal UD delivered from the synchronization detector 35. Consequently, a count of the counter indicates the number stored in the buffer circuit 31. When the count of the counter exceeds a prescribed number which specifies a data capacity of the buffer circuit 31, the skew detection circuit 32 produces a first overskew signal OSK1 representative of the fact that the count is greater than the prescribed number. This shows that the first overskew signal OSK1 indicates that a skew becomes large as compared with the data capacity of the buffer circuit 31 included in the first compensator unit 261.

The first overskew signal OSK1 is supplied to the synchronization detector 35 together with the detection signal DT and the internal readout signal sequence INR. In addition, the synchronization detector 35 is also supplied with a position signal PO which is representative of a position of each resynchronization code (RE-SYNC) 18 and which is produced in a manner to be described later. Second through k-th overskew signals OSK2 to OSKk are also supplied from the second through k-th compensator units 262 to 26k.

Figure 3:
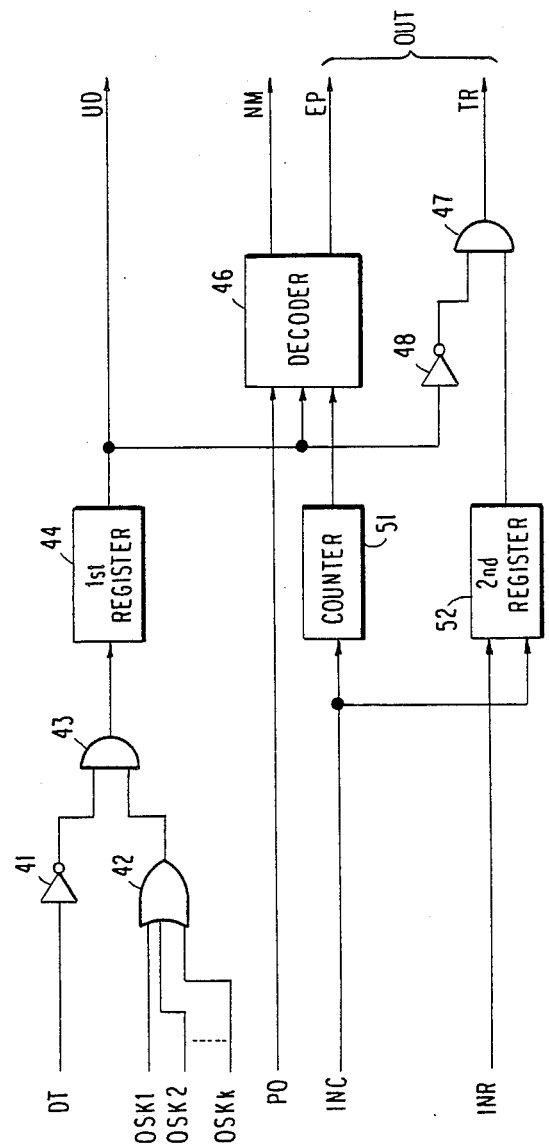
FIG. 3 shows a block diagram of a synchronization circuit used in the skew compensation circuit illustrated in FIG. 1.

Referring to FIG. 3 together with FIG. 1, the detection signal DT and the first through k-th overskew signals OSK1 to OSKk are received by the synchronization detector 35, as shown in FIG. 3, and sent through an inverter 41 and an OR gate 42 to a first AND gate 43. In this connection, it is readily understood that the first AND gate 43 is opened to produce a logic "1" level signal when at least one of the first through k-th overskew signals OSK1 to OSKk is given from the first through k-th compensator units 261 to 26k while no detection signal DT is detected by the code detector 34 of the first compensator unit 261. The logic "1" level signal is set to a first register 44 and is supplied from the first register 44 as the undetection signal UD to the skew detection circuit 32 and the clock production circuit 33 (FIG. 1), as mentioned before. The undetection signal UD is also delivered to a decoder 46 directly and to a second AND gate 47 through an additional inverter 48, as shown in FIG. 3.

In addition, the internal clock pulse sequence INC is sent to a conter 51 to be counted one by one. Inasmuch as the internal clock pulses INC are produced in synchronism with the data units of the internal readout signals INR, respectively, the counter 51 counts the number of the data units of the internal readout signals INR received by the synchronization detector 35 and supplies the decoder 46 with a count value representative of the number of the data units of the internal readout signals INR.

The internal readout signals INR are successively set into a second register 52 which may be formed, for example, by a type D flip-flop. Thereafter, the second counter 52 is timed by the internal clock pulses INC to be sent to the AND gate 47. When the undetection signal UD is not produced by the first register 44, a register output signal is sent as a sequence of transmission data signals TR through the AND gate 47 to a utilization device, such as an error correction circuit (not shown). In this event, the decoder 46 produces a number signal NM representative of the number of the data units during no reception of the undetection signal UD.

On the other hand, when the undetection signal UD is delivered to the decoder 46 and the additional inverter 47, the decoder 46 produces an error track indication pointer EP which lasts until reception of the position signal PO which will later be described in detail. The error track indication pointer EP is followed by a dummy data signal of all zeros. During production of the error track indication pointer EP and the dummy data signal, the transmission data signals TR are intercepted by the AND gate 47 and therefore not transmitted to the utilization device.

At any rate, the transmission data signals TR and the error track indication pointer EP are produced as a sequence of output signals OUT.

In FIG. 1, the clock production circuit 33 is included in each compensator unit 26 (suffix omitted). The illustrated compensator unit 261 is supplied with the first overskew signal OSK1, the ready signal RY, the detection signal DT, the undetection signal UD, and the position signal PO to produce the internal clock pulses INC and a sequence of transmission clock pulses TCK synchronized with the transmission data signals TR. The transmission clock pulses TCK are produced in synchronism with those of the other tracks. More specifically, the clock production circuit 33 is enabled by the ready signal RY to start production of the internal clock pulse sequence INC each time when the detection signal DT is given from the code detector 34. Thereafter, the internal clock sequence INC and the transmission clock pulses sequence TCK are controlled with references to the first overskew signal OSK1, the undetection signal UD, and the position signal PO, as will become clear as the description proceeds.

Figure 4:
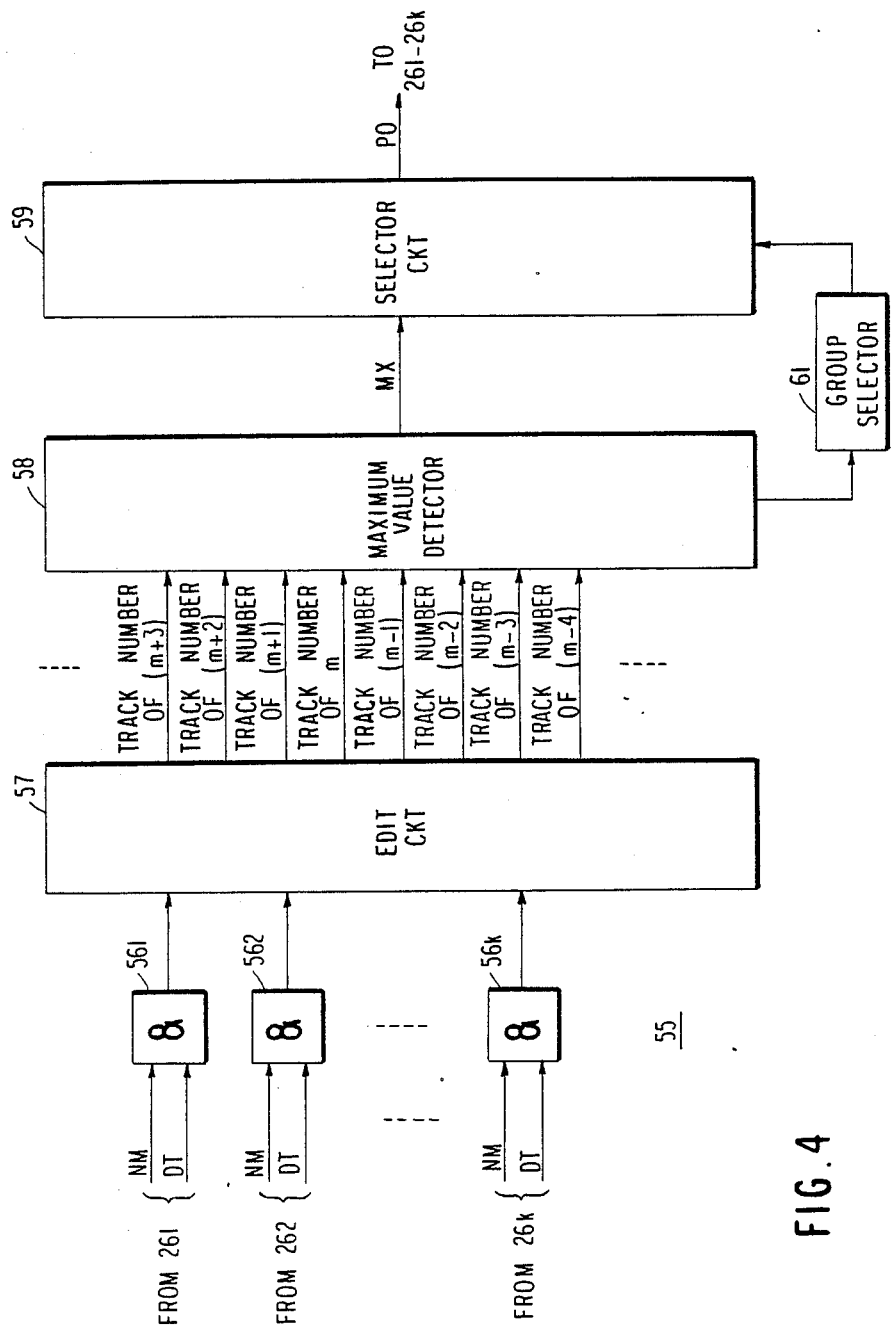
FIG. 4 shows a block diagram of a resynchronization position detector used in the skew compensation circuit illustrated in FIG. 1.

Referring to FIG. 4 afresh and FIG. 1 again, the detection signal DT and the number signal NM are sent from each compensator unit 26l through 26k to a resynchronization position detector 55. As shown in FIG. 4, the resynchronization position detector 55 comprises first through k-th AND circuits 56l to 56k supplied from the first through k-th compensator units 26l to 26k with the number signals NM and the detection signals DT in pairs, respectively. Each AND circuit 56 (suffix omitted) allows the number signal NM to pass therethrough only in the presence of the detection signal DT. As a result, the number signals NM of the respective tracks are indicative of the numbers of the transmission data signals TR (FIG. 3) and sent to an edit circuit 57.

As described in conjunction with FIG. 2, each of the standard data parts 20 has the first invariable length while the additional data part is variable in length. Therefore, the resynchronization codes 18 are detected from most of the tracks when the transmission data signals TR are counted to a predetermined number (depicted at n) as long as the magnetic tape 11 is rotated in the normal sense 13. Taking the above into consideration, the resynchronization position detector 55 statistically processes the number signals NM derived from the tracks by the use of the edit circuit 57, a maximum value detector 58, a selector circuit 59, and a group selector 61, as will later be described in conjunction with an operation carried out during rotation of the magnetic tape 11 in the reverse sense. At any rate, the selector circuit 59 delivers the position signal PO to the first through k-th compensator units 26l to 26k to specify the positions of the resynchronization signals 18 when the readout signal sequences RD1 to RDk are read out of the respective tracks in both the normal and the reverse senses.

Figure 5:
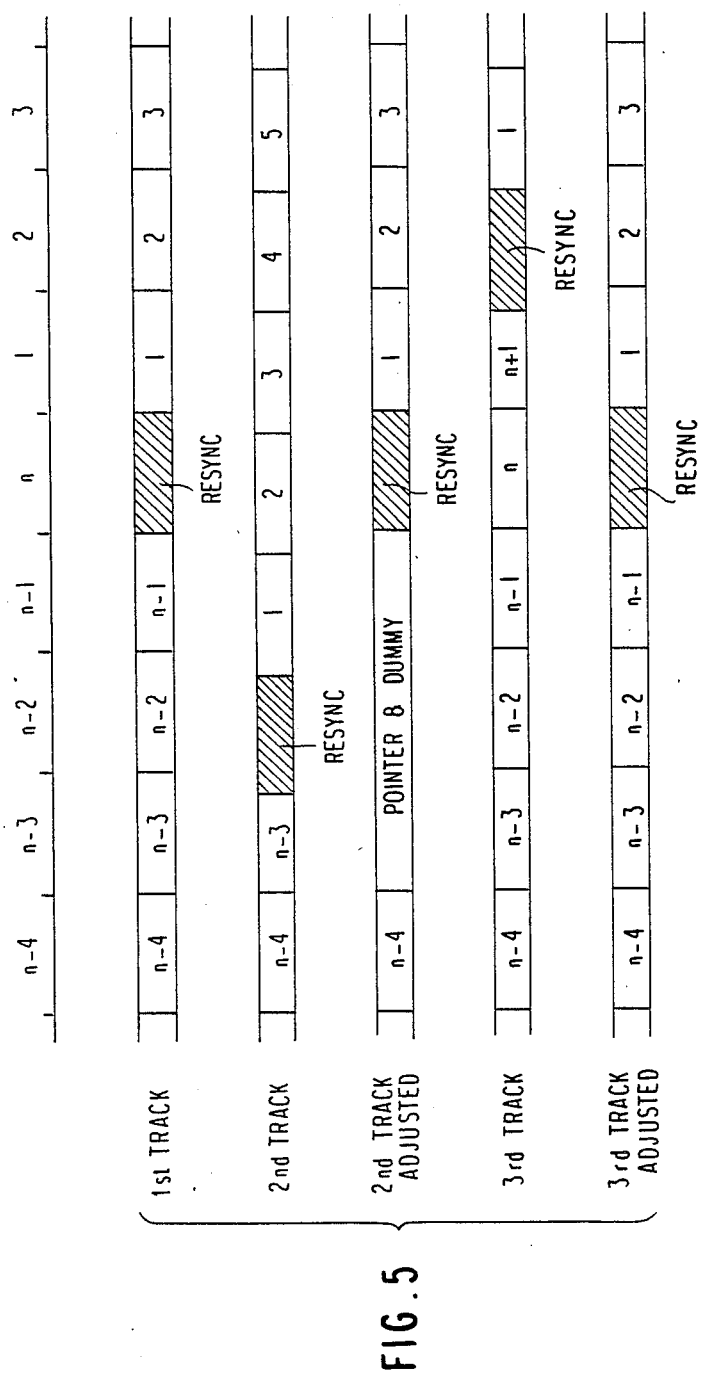
FIG. 5 shows a time chart for use in describing operation of the skew compensation circuit, which is carried out when a magnetic tape is driven in a normal sense.

Referring to FIG. 5 in addition to FIGS. 1 and 2, description will be made as regards the case where the readout signal sequences RD1 to RDk are read out of the magnetic tape 11 in the normal sense 13 to derive the readout signal sequences RD1 to RDk from the respective tracks. The first through k-th compensator units 26l to 26k do not produce the transmission data signals TR until the start identification codes (SYNC) 17 are detected from all of the tracks or until the overskew signal OSK is detected from either one of the tracks.

It is assumed that no start identification code 17 is detected from one of the tracks and the overskew signal OSK is detected in connection with the one track. In this event, the one track is regarded as an undetection track of the start identification code 17 by the synchronization detector 35 of the compensator unit 26 corresponding to the undetection track. Thereafter, transmission of the transmission data signals TR may be started from the synchronization detectors 35 corresponding to the remaining tracks, with the undetection track neglected. From the undetection track, the error track indication pointer EP and the dummy data signal are produced in the manner mentioned in conjunction with the decoder 46 of FIG. 3.

Subsequently, the synchronization detector 35 and the clock production circuit 33 are put into operation so as to predict or determine the positions of the resynchronization codes 18. In FIG. 5, it is assumed that each of the standard data parts is assumed to be composed of the data units, n in number, as shown along a top line of FIG. 5. Under the circumstances, each of the synchronization detector 35 successively counts the number of the data units included in the internal readout signal sequences IR. If no skew takes place in connection with each track, the resynchronization code (RESYNC) is detected at a position of an n-th one of the data units after transmission of first through (n−1)-th data units, as shown along a second line of FIG. 5 in connection with the first track.

On the other hand, let the resynchronization code (RESYNC) be detected on the way of transmission of an (n−3)-th data unit after transmission of an (n−4)-th data unit, as exemplified along a third line of FIG. 5 in connection with the second track. In this event, the clock production circuit 33 of the second compensator unit 26₂ for the second track is supplied from the resynchronization position detector 55 with the detection signal DT without the position signal PO. Under the circumstances, the clock production circuit 34 in question stops the internal clock pulse sequence INC without interrupting the transmission clock pulse sequence TCK. The resultant buffer circuit 31 intermittently stops readout of the internal readout signal sequence INR in the second compensator unit 26₂. In addition, stoppage of the internal clock sequence INC is transmitted to the decoder 46 of the synchronization detector 35 (FIG. 3) and results in production of the error track indication pointer EP followed by the dummy data signal. Such a dummy data signal lasts until the position signal PO is supplied from the resynchronization position detector 55 to the decoder 46 in synchronism with the n-th data unit. In consequence, the internal readout signal sequence derived from the second track is modified into the output signal sequence OUT, as shown along a fourth line of FIG. 5. Thus, the internal readout signal sequence of the second track is adjusted in a manner illustrated in FIG. 5.

Furthermore, let no resynchronization code (RESYNC) be detected after transmission of the (n−1)-th data unit, as shown along a fifth line of FIG. 5 in connection with the third track. In this event, the third compensator unit for the third track makes the buffer circuit 31 carry out an idle or virtual readout operation until detection of a following resynchronization code or stops transmission of the transmission data signals until the overskew signal OSK is detected from one of the remaining tracks. When the resynchronization code (RESYNC) is detected during reception of an (n+1)-th data unit, as shown along the fifth line of FIG. 5, an n-th and an (n+1)-th data units are not transmitted in the internal signal sequence derived from the third track, as shown along a sixth line of FIG. 5. When the following resynchronization code is detected, transmission is successively started from the first one of the data units after detection of the following resynchronization code (RESYNC).

Similar operation is repeated in each compensator unit as long as the resynchronization code appears each time when the data units are counted to n.

Figure 6:
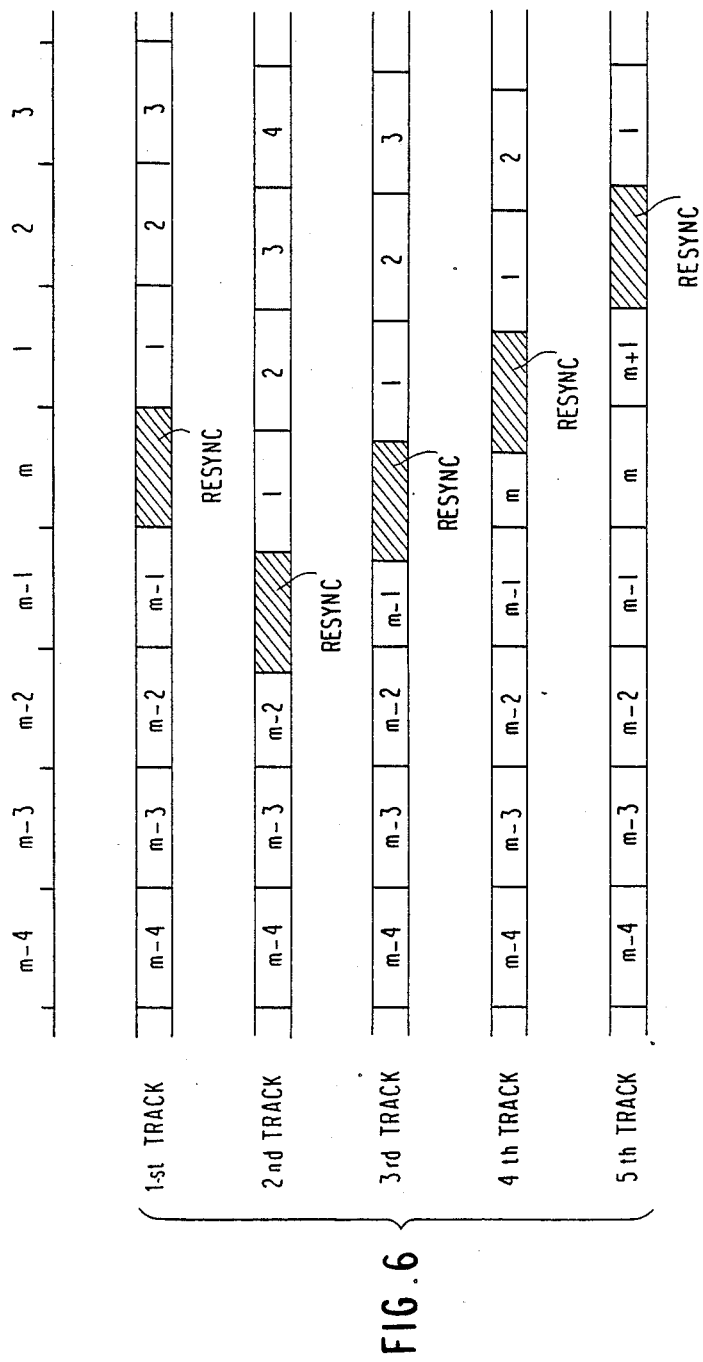
FIG. 6 shows another time chart for use in describing operation of the skew compensation circuit, which is carried out when the magnetic tape is driven in a reverse sense.

Referring to FIG. 6 in addition to FIGS. 1 and 4, description will be made about the case where the readout signal sequences RD1 to RDk are read out of the respective tracks in the reverse sense. In this event, it is to be noted that the positions of the trailing resynchronization signals 18 can not be decided from the number of the data units while the readout signal sequences are read out in the reverse sense 14, because the second length of the additional data part is variable, as mentioned before. In FIG. 6, a natural number m is used to specify the second length, where m is not larger than n.

In FIG. 6, the data units are illustrated which are read out of the first through fifth tracks during a time interval from an (m−1)-th position or time slot to a third position or time slot. In the example being illustrated, the resynchronization code (RESYNC) is detected from the first track at the m-th time slot. The first compensator unit 261 is put into a waiting state until the resynchronization codes (RESYNC) are detected from a plurality of the tracks at the m-th position or until the overskew signal OSK is detected from one of the tracks. From the second and the third tracks, the resynchronization codes (RESYNC) are detected during the (m−1)-th time slot and over both the (m−1)-th and the m-th time slots, respectively, while the resynchronization codes (RESYNC) are detected from the fourth and fifth tracks over both the m-th and the first time slots and during the second time slot, respectively, as shown in FIG. 6.

Inasmuch as m is not fixed, as mentioned before, it is difficult to decide a normal position or time slot of the resynchronization codes (RESYNC) during the readout in the reverse sense. In FIG. 6, it is difficult to determine which one of the (m−1)-th time slot, the m-th time slot, the first time slot, and the second time slot is the normal position of the resynchronization codes (RESYNC).

Under the circumstances, the resynchronization position detector 55 is effectively operable during the readout in the reverse sense in a manner to be described below to determine the normal position of the trailing resynchronization code which appears at the beginning of the readout in the reverse sense. More specifically, a pair of the number signal NM and the detection signal DT is delivered from each compensator 261 to 26k to the resynchronization position detector 55. Each detection signal DT is assumed to be produced by detecting the resynchronization code (RESYNC). The number signals NM and the detection signals DT are sent from the first through k-th compensator units 261 to 26k to the first through k-th AND circuits 561 to 56k (FIG. 4) in pairs, respectively. As a result, the numbers (m−2), (m−1), m, (m+1), and (m+2) (which will be called data unit numbers hereinafter) are supplied from the first through k-th AND circuits 561 to 56k to the edit circuits 57 (FIG. 4) in timed relation to the detection signals DT detected from the first through fifth tracks. The edit circuit 57 neglects the number signal NM sent from a compensator unit wherein no start identification code is detected. In addition, the edit circuit 57 counts a track number of the tracks at every one of the data unit numbers. For example, the tracks of the data unit numbers (m−1), m,(m+1), (m+2) are individually counted in the edit circuit 57 to be produced as the track numbers classified into the data unit numbers, respectively. In this connection, the edit circuit 57 may be referred to as a classifying circuit for classifying the data unit numbers.

Temporarily referring to FIG. 7 together with FIG. 4, the editing circuit 57 produces the track numbers as shown in FIG. 7. Specifically, the track numbers are classified into classes CL of the data numbers (m−4), (m−3), (m−2), (m−1), m, (m+1), (m+2), and so on, as shown in FIGS. 7(a) to (c), and are sent to the maximum value detector 58. In FIGS. 7(a) and (b), the class of the data number m exhibits a maximum value while the classes CL of the data numbers (m−4) and m exhibit maximum values in FIG. 7(c).

In FIG. 4, the maximum value detector 58 detects the maximum value or values from the track numbers sent from the edit circuit 57 to supply a single or a plurality of maximum value signals (collectively depicted at Mx in FIG. 4) to the selector 59. On the other hand, the maximum value detector 58 is coupled to the group selector 61 to be divided into a plurality of groups when a plurality of the maximum values are detected by the maximum value detector 58, as shown in FIG. 7(c). The group selector 61 selects one of the groups that includes the greatest number of the tracks. As a result, the class of the data number m is selected by the group selector 61, as shown by a hatch in FIG. 7(c). At any rate, the class CL of the data number m is determined as the normal positions of the resynchronization codes (RESYNC) in FIGS. 7(a) through (c).

From this fact, it is readily understood that the resynchronization position detector 55 statistically processes the number signals NM sent from the respective compensator units by the use of the edit circuit 57. Thereafter, the resynchronization position detector 55 determines a position of an initial one of the resynchronization codes during rotation of the magnetic tape in the reverse sense by the use of the maximum value detector 58 and the selector 59.

The position of the initial one of the resynchronization codes is delivered as the position signal PO to the synchronization detector 35 and the clock production circuit 33 (FIG. 1) of each compensator unit 26 to be processed in the manner described in conjunction with FIG. 5.

While this invention has thus far been described in conjunction with a preferred embodiment thereof, it will readily be possible for those skilled in the art to put this invention into practice in various other manners. For example, each compensator unit 26 may count a bit number of each of the standard and the additional data parts instead of the data units. At any rate, each compensator unit may count a number of the data signals to specify the first and the second lengths.

What is claimed is:

1. A skew compensation circuit operable in response to a plurality of readout signal sequences read out of a plurality of tracks of a magnetic tape, respectively, driven in a selected one of normal and reverse senses, each of said readout signal sequences being composed of a start code, an end code, a plurality of resynchronization codes interspersed between said start and said end codes, a plurality of standard data parts between said start code and a leading one of said resynchronization codes and between two adjacent ones of said resynchronization codes, and an additional data part between a trailing one of said resynchronization codes and said end code, each of said standard data parts having a standard length for arranging a preselected number of data signals while said additional data part has an additional length which is not longer than said standard length, said start, said end, and said resynchronization codes of the respective readout signal sequences being produced simultaneously with one another unless a skew is present among said tracks, said skew compensation circuit being for compensating for said skew among said tracks and comprising:

counting means individually supplied with said readout signal sequences read out of the magnetic tape driven in said selected one of the normal and the reverse senses for individually counting numbers of said data signals of the standard and the additional data parts in response to the start, the end, and the resynchronization codes derived from the respective tracks to produce data number signals representative of said numbers of the data signals arranged in said standard and said additional parts on the respective tracks; and processing means coupled to said counting means for statistically processing said data number signals to detect the additional lengths of the additional data parts and to determine a position which said trailing one of the resynchronization codes has in each readout signal sequence read out while said magnetic tape is driven in said reverse sense.

2. A skew compensation circuit as claimed in claim 1, wherein said counting means comprises:

a plurality of circuit elements equal in number to said tracks;

each of said circuit elements comprising:

a buffer circuit responsive to a selected one of said readout signal sequences and a sequence of readout clock pulses for storing each of said readout signal sequence to produce a sequence of internal readout signals in synchronism with said selected one of the readout clock pulses;

detecting means coupled to said buffer circuit for detecting the start code, the end code, and the resynchronization codes from said internal readout signal sequence to produce a detection signal representative of detection of the start, the end, and the resynchronization codes;

internal clock producing means responsive to said detection signal for producing a sequence of internal clock pulses synchronized with said internal readout signals;

means for supplying said internal clock pulses with said buffer circuit as said readout clock pulse sequences; and signal producing means responsive to said internal clock pulses and said detection signal for producing each of said data number signals representative of said number of the data signals arranged in said standard and said additional parts.

3. A skew compensation circuit as claimed in claim 1, wherein said processing means comprises:

classifying means responsive to said data number signals for statistically classifying said data number signals with reference to said numbers of the data signals into track numbers each of which is given by counting said tracks having a common one of said data numbers;

maximum number detecting means coupled to said classifying means for detecting a maximum one of said track numbers; and means coupled to said maximum number detecting means for determining said position from said maximum one of the track numbers.

* * * * *